Oct. 16, 1923.
A. HUBER
COASTER
Filed April 12, 1923
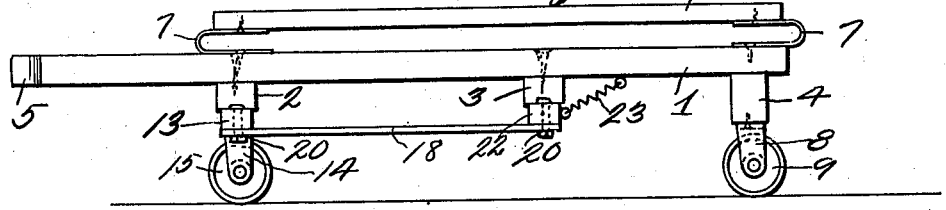
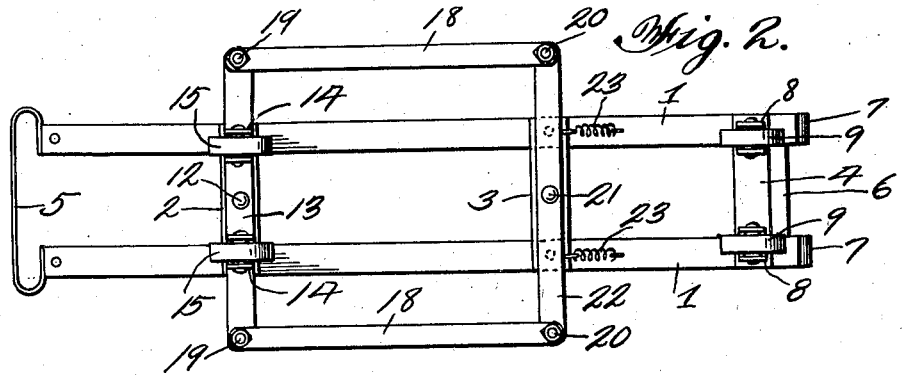
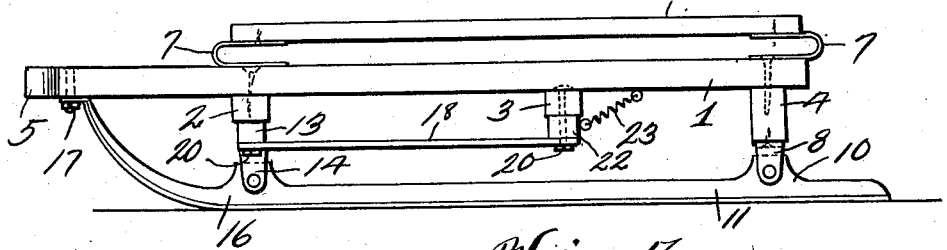
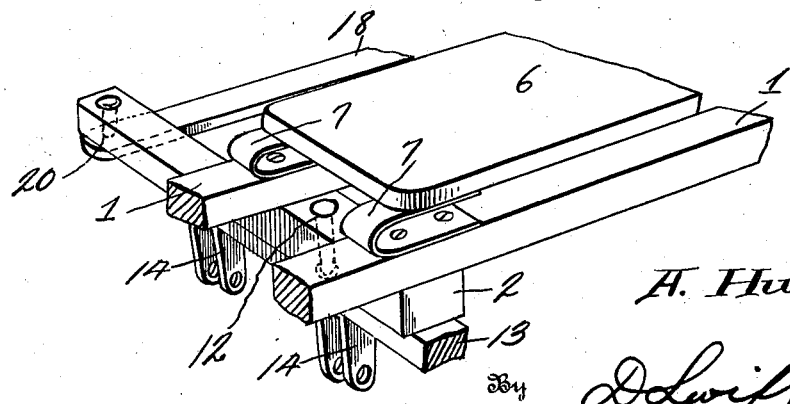
Inventor
A. Huber Patented Oct. 16, 1923.

1,470,921

UNITED STATES PATENT OFFICE.

ANDREW HUBER, OF STERLING, ILLINOIS.

COASTER.

Application filed April 12, 1923. Serial No. 631,607.

*To all whom it may concern:*

Be it known that I, ANDREW HUBER, a citizen of the United States, residing at Sterling, in the county of Whiteside, State of Illinois, have invented a new and useful Coaster; and I do hereby declare the following to be a full, clear, and exact description of the invention, such as will enable others skilled in the art to which it appertains to make and use the same.

The invention relates to coasters, and has for its object to provide a device of this character, which may have easily and quickly applied thereto, sled runners or wheels, thereby allowing the same device to be used as a sled or a coaster. Also to provide brackets, which brackets will receive and hold either the sled runners or the wheels.

A further object is to mount the forward brackets on transversely disposed pivoted bar, pivoted to the under side of the body of the coaster and to provide hand engaging bars at opposite sides of the coaster whereby the transversely disposed bar may be moved for guiding purposes. Also to provide spring means for normally returning the guiding mechanism to normal position after an operation thereof, and upon release of the guiding mechanism.

A further object is to provide the upper side of the body with a spring supported board for taking up the shock when a child runs with the coaster and falls on the same for coasting purposes.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the coaster.

Figure 2 is a bottom plan view of the coaster.

Figure 3 is a side elevation of the coaster, showing sled runners applied thereto.

Figure 4 is a perspective view of a forward-portion of the coaster, showing the brackets for receiving and holding either wheels or sled runners.

Referring to the drawing, the numeral 1 designates spaced parallel bars, which bars are connected together by transversely disposed bars 2, 3 and 4. The forward ends of the bars 1 are connected together by a spring bumper 5, which bumper, when the coaster comes into engagement with an object will absorb the shock.

Disposed above the bars 1 and in spaced relation to the bars 1 is an elongated member 6, on which the person using the coaster rests during a coasting operation, and in the usual manner. However where coasters are used, it is the custom for the user to run with the coaster and fall onto the member 6, consequently when the coaster comes into engagement with the ground or snow the shock on the user is considerable. To take up the shock incident to the above operation, the elongated member 6 is supported on U-shaped springs 7, which are secured to the member 6 and to the bars 1, therefore it will be seen that the springs will take up the shock in such a manner and it will not reach the body of the user.

Secured to the underside of the spaced bars 1, adjacent their rear ends is the transversely disposed bar 4, to the underside of which is secured spaced U-shaped brackets 8, which brackets are adapted to receive either the wheels 9 as shown in Figures 1 and 2 or the rear ends 10 of the sled runners 11 as shown in Figure 3. Pivotally connected at 12, to the transversely disposed bar 2 is a horizontally disposed and transversely disposed bar 13, which is a guide bar, however the underside of the guide bar 13 is provided with downwardly extending spaced brackets 14, which brackets are similarly constructed as the brackets 8 and in longitudinal alignment therewith. The brackets 14 receive either the coaster wheels 15 as shown in Figures 1 and 2 or the forward ends 16 of sled runners 11, therefore it will be seen that the device can be easily and quickly converted from a wheel supported coaster to a sled runner supported coaster. Where sled runners 11 are used the forward ends 16 thereof extend upwardly and are secured to the undersides of the bars 1 by means of bolts 17. During the coasting operation the operator may place his feet on the bars 13 for steering the device, either by the movement of the wheels 15 or by slight flexing of the sled runners 11. However when the operator is lying on the member 6 the bar 13 may be controlled by the operator's hand by grasping the longitudinally disposed bars 18 located on opposite sides of the device, which bars have their forward ends pivotally connected at 19 to the pivoted bar 13, and their rear ends pivoted at 20 to a transversely disposed pivoted bar, which is pivoted at 21 to the bar 3, said transversely disposed pivoted bar being designated by the numeral 22. Therefore a parallel movement is provided in the steering mechanism. To return the steering mechanism to normal position when released, coiled springs 23 are provided, which coiled springs have one of their ends connected to the pivoted bar 22 at opposite sides of its pivotal point and their other ends connected to the under sides of the spaced bars 1. It will be seen that during the steering operation, that when either of the bars 18 are moved longitudinally, one of the coiled springs 23 will be stretched and upon release of the bars 18, the springs will return the steering mechanism to normal position as shown in Figure 2.

From the above it will be seen that a combined coaster of a wheel supported type, or sled runner supported type is provided, which may be easily converted for winter or summer use. It will also be seen that a steering mechanism is provided for the coaster, which is simple in construction, positioned where it can be easily manipulated by the operator, while lying on the coaster, and the steering mechanism will be returned to normal position after each operation thereof.

The invention having been set forth what is claimed as new and useful is:—

1. A coaster comprising a body member, said body member being formed from spaced bars, a board supported above the body member, springs interposed between the board and the spaced bars, transversely disposed bars carried by the underside of the spaced bars, the rear transversely disposed bar supporting brackets, ground engaging elements carried by said brackets, a transversely disposed pivoted bar carried by the forward transversely disposed bar, brackets carried by the pivoted bar, ground engaging elements carried by the last named brackets, a second transversely disposed pivoted bar, connecting bars connecting the ends of the pivoted bars together, springs connected to the ends of the second pivoted bar and to the spaced bars, said springs forming means for normally holding the ground engaging members in longitudinal relation to the body member.

2. The combination with a coaster having ground engaging elements, said coaster comprising a body member, rear ground engaging members carried by said body member, forward ground engaging members carried by transversely disposed pivoted bar, of steering means for said pivoted bar, said steering means horizontally and longitudinally disposed connecting bar pivoted to the ends of the pivoted bar, a transversely disposed pivoted bar pivoted to the body member and having its ends pivoted the rear ends of the connecting bars, and spring connected to the last named pivoted bar and to the body member and forming means for normally returning the pivoted bars to transverse positions.

In testimony whereof I have signed my name to this specification in the presence of two subscribing witnesses.

ANDREW HUBER.

Witnesses:
JESS S. GAULRAPP,
ATHA L. HALL.